US012122638B2

(12) United States Patent
Nash et al.

(10) Patent No.: US 12,122,638 B2
(45) Date of Patent: Oct. 22, 2024

(54) VERTICAL PLATFORM LIFT AND CONTROL SYSTEM

(71) Applicant: Harmar Mobility LLC, Sarasota, FL (US)

(72) Inventors: Derek J. Nash, Bradenton, FL (US); Byron C.y. Kim, Overland Park, KS (US)

(73) Assignee: Harmar Mobility, LLC, Sarasota, FL (US)

( * ) Notice: Subject to any disclaimer, the term of this patent is extended or adjusted under 35 U.S.C. 154(b) by 959 days.

(21) Appl. No.: 16/570,464

(22) Filed: Sep. 13, 2019

(65) Prior Publication Data

US 2021/0078822 A1 Mar. 18, 2021

(51) Int. Cl.
*B66B 1/08* (2006.01)
*B66B 1/24* (2006.01)
*B66B 9/00* (2006.01)

(52) U.S. Cl.
CPC . *B66B 1/24* (2013.01); *B66B 9/00* (2013.01)

(58) Field of Classification Search
CPC B66B 1/00; B66B 5/00; B66B 1/3461; B66B 5/0018; B66B 1/24; B66B 9/00; B66B 1/08; B66B 9/08
See application file for complete search history.

(56) References Cited

U.S. PATENT DOCUMENTS 5,141,380 A * 8/1992 Kato .................... B65G 1/0421 414/281
D331,388 S * 12/1992 Dahnert ....................... D13/162
5,916,288 A * 6/1999 Hartman ................ B60K 35/00 340/461
5,992,562 A * 11/1999 Boeckman ............ B66F 11/042 182/69.5
6,086,314 A * 7/2000 Savaria .................. A61G 3/062 414/921
D546,770 S * 7/2007 Herbstritt ..................... D13/177
D563,624 S * 3/2008 Kato .............................. D34/35
D578,272 S * 10/2008 Kato .............................. D15/28
D578,273 S * 10/2008 Kato .............................. D34/35
D635,101 S * 3/2011 Farrow ........................ D13/162

(Continued)

FOREIGN PATENT DOCUMENTS

CN 101648663 B 9/2011
CN 105035902 A 11/2015

(Continued)

OTHER PUBLICATIONS

Harmar VPL, announced 2020 [online], [site visited Nov. 3, 2020]. Available from internet, URL: https://harmar.com/home-ifts/rpl/ ( Year: 2020).

(Continued)

*Primary Examiner* — Edwin J Toledo-Duran
(74) *Attorney, Agent, or Firm* — Banner & Witcoff, Ltd.

(57) ABSTRACT

Systems, apparatuses, and methods are described for a vertical platform lift assembly control system are disclosed. The control system may provide a method for monitoring sensors for the vertical platform lift, and may determine operating modes and fault conditions from the sensor data. An indicator system for the vertical platform lift may provide user feedback based on sensor data and the status of the control system.

19 Claims, 12 Drawing Sheets

(56) References Cited

U.S. PATENT DOCUMENTS

| | | | | |
|---|---|---|---|---|
| D820,220 | S * | 6/2018 | Kato | D13/162 |
| D859,775 | S * | 9/2019 | Nilsson | D34/34 |
| 10,421,609 | B2 | 9/2019 | Otto et al. | |
| D874,081 | S * | 1/2020 | De Jong | B66F 7/20<br>D34/28 |
| D891,023 | S * | 7/2020 | Wenjing | D34/34 |
| 2007/0137944 | A1* | 6/2007 | Lam | A61G 3/063<br>187/267 |
| 2008/0060880 | A1* | 3/2008 | Finkbeiner | B66F 7/28<br>187/237 |
| 2013/0118839 | A1* | 5/2013 | Penn | E04G 3/30<br>187/262 |
| 2015/0014098 | A1* | 1/2015 | Stolzl | B66B 1/32<br>187/394 |
| 2015/0210506 | A1* | 7/2015 | Kattainen | B66B 5/02<br>187/393 |
| 2015/0272799 | A1* | 10/2015 | Tiffin | A61G 7/1005<br>4/496 |
| 2017/0022028 | A1* | 1/2017 | Cortona | B66B 3/002 |
| 2017/0313548 | A1* | 11/2017 | Nakari | B66B 5/00 |
| 2017/0334696 | A1* | 11/2017 | Otto | B66F 9/18 |
| 2017/0355554 | A1* | 12/2017 | Eleid | B66B 1/3461 |
| 2018/0000021 | A1 | 1/2018 | Creel, Jr. et al. | |
| 2018/0111809 | A1* | 4/2018 | Rodenburg | B66F 9/07 |
| 2020/0071127 | A1* | 3/2020 | Nikander | B66B 5/0031 |
| 2021/0078822 | A1* | 3/2021 | Nash | B66B 9/08 |
| 2021/0078824 | A1* | 3/2021 | Nash | B66B 1/08 |
| 2021/0087017 | A1* | 3/2021 | Pahlke | B66B 13/22 |
| 2021/0276848 | A1* | 9/2021 | Miller | B66F 17/006 |
| 2021/0371242 | A1* | 12/2021 | Schönauer | B66B 5/0031 |
| 2022/0117805 | A1* | 4/2022 | Toolan | B60P 1/4421 |
| 2023/0286777 | A1* | 9/2023 | Li | G01M 13/045 |

FOREIGN PATENT DOCUMENTS

| | | |
|---|---|---|
| KR | 10-2012-0051358 A | 5/2012 |
| KR | 1020120051358 | 5/2012 |

OTHER PUBLICATIONS

Trus-T Lift, announced 2020 [online], [site visited Nov. 3, 2020]. Available from internet, URL: https://assisted-lifting.com/products/trus-t-lift-residential-wheelchair-lift (Year: 2020).

Freedom Lift, announced 2020 [online], [site visited Nov. 3, 2020]. Available from internet, URL: https://www.freedomliftsystems.com/ APFLR400STRLAL (Year: 2020).

Ameriglide, announced 2020 [online], [site visited Nov. 3, 2020]. Available from internet, URL: https://www.ameriglide.com/item/AmeriGlide-AG-HERCJR.html (Year: 2014).

Freedom Easy Ride II, Vertical Platform Lift, Owner;s Manual, FREEDOMLiftSystems by Accessibility Professionals, Apr. 10, 2020, 24 pgs., https://www.freedomliftsystems.com/APFVPLR400STRLAL?gclid=EAlalQobChMlp6vsoc_Y7wlVkljICh1_kAA5EAQYAiABEgKNO_D_BwE.

Oct. 26, 2021—(CA) OA—App. No. 3092851.

Oct. 25, 2021—(CA) OA—App. No. 3092980.

Oct. 13, 2022—(US) Office Action U.S. Appl. No. 16/570,646.

Aug. 7, 2022—(CA) 2nd OA—App. No. 3092851.

Aug. 10, 2022—(CA) 2nd OA—App. No. 3092980.

* cited by examiner

| Service Function/Interlock & Limit Switches | | | | | | | | | | | Allow Platform to Move | |
|---|---|---|---|---|---|---|---|---|---|---|---|---|
| Service Switch | Pit Switch | E-Stop | Final Limit | Belt Monitor | Safety Nut | Safety Pan | Float Switch | Bottom Latch/Lock | Mid Latch/Lock | Top Latch/Lock | UP | DOWN |
| T | F | F | F | X | X | X | X | X | X | X | Yes | Yes |
| T | F | F | T | X | X | X | X | X | X | X | Yes | Yes |
| T | F | T | X | X | X | X | X | X | X | X | No | No |
| T | T | F | X | X | X | X | X | X | X | X | No | No |
| T | T | T | X | X | X | X | X | X | X | X | No | No |

FIG. 7

VERTICAL PLATFORM LIFT AND CONTROL SYSTEM

TECHNICAL FIELD

Aspects of the present disclosure generally relate to processes, systems, and apparatuses for vertical platform lift control systems and indicators.

BACKGROUND

Mobility-impaired individuals frequently use mobility assistance devices such as, for example, power chairs, scooters, or wheelchairs to aid in transportation. While these mobility assistance devices may provide greatly increased mobility over uniform surfaces, they may not be effective on non-uniform surfaces, such as, for example, stairs. Vertical platform lifts may provide users of mobility assistance devices a method of navigating these non-uniform surfaces.

SUMMARY

The following presents a simplified summary of the present disclosure in order to provide a basic understanding of example aspects described herein. This summary is not an extensive overview, and is not intended to identify key or critical elements or to delineate the scope of the claims. The following summary merely presents various described aspects in a simplified form as a prelude to the more detailed description provided below.

Systems, methods, and apparatuses are described for providing a processor driven control system for vertical platform lifts. The vertical platform lift control system may monitor a variety of sensors associated with the vertical platform lift. Based on these sensors, the control system may provide a visual or audio alarm. The control system may determine the probability and severity of risks associated with the sensor data to provide an indication of the alarm level.

The vertical platform lift control system may store lift data in memory associated with the processor. The control system memory may be accessed by the control system to determine when repairs may be necessary. For example, based on a comparison of current and historical performance, the control system may determine additional data for troubleshooting repairs. The control system may also enable remote monitoring and diagnostics, further aiding the ease of repair.

A method for providing a processor driven control system for a vertical platform lift may comprise receiving, by a control system of a lift assembly and from a first sensor located on the lift assembly, a first sensor data of a first data type. The control system may determine, based on the first data type and a comparison of the first sensor data and a first threshold, a fault condition. The control system may determine, based on the fault condition and by the control system, an operating mode for the lift assembly. Based on the fault condition, the control system may send the fault condition to an indicator system that may signal the fault condition to a user.

The fault condition may further be determined based on a qualitative probability and severity analysis of a comparison of the first sensor data and a threshold and based on the first data type.

The control system may further, based on the operating mode, prevent or restrict movement of the lift assembly. The first sensor may be a temperature sensor sending temperature data for comparison with a data threshold. The first sensor may be a current sensor sending current data for comparison with a current threshold.

The control system may further consist of a second sensor located on the lift assembly with sensor data of a second data type. Determining the fault condition may be further determined based on the second data type and a comparison of the second data and a second threshold.

The second sensor may be a landing limit switch indicating the presence of a platform of the lift assembly. The control system may further send the fault condition to a remote computing device at a location different from the lift assembly.

The summary here is not an exhaustive listing of the novel features described herein, and are not limiting of the claims. These and other features are described in greater detail below.

BRIEF DESCRIPTION OF THE DRAWINGS

Some features herein are illustrated by way of example, and not by way of limitation, in the accompanying drawings. In the drawings, like numerals reference similar elements between the drawings.

FIG. 7 shows example service mode functionality as may be used to implement example features described herein.

DETAILED DESCRIPTION

Figure 1A:
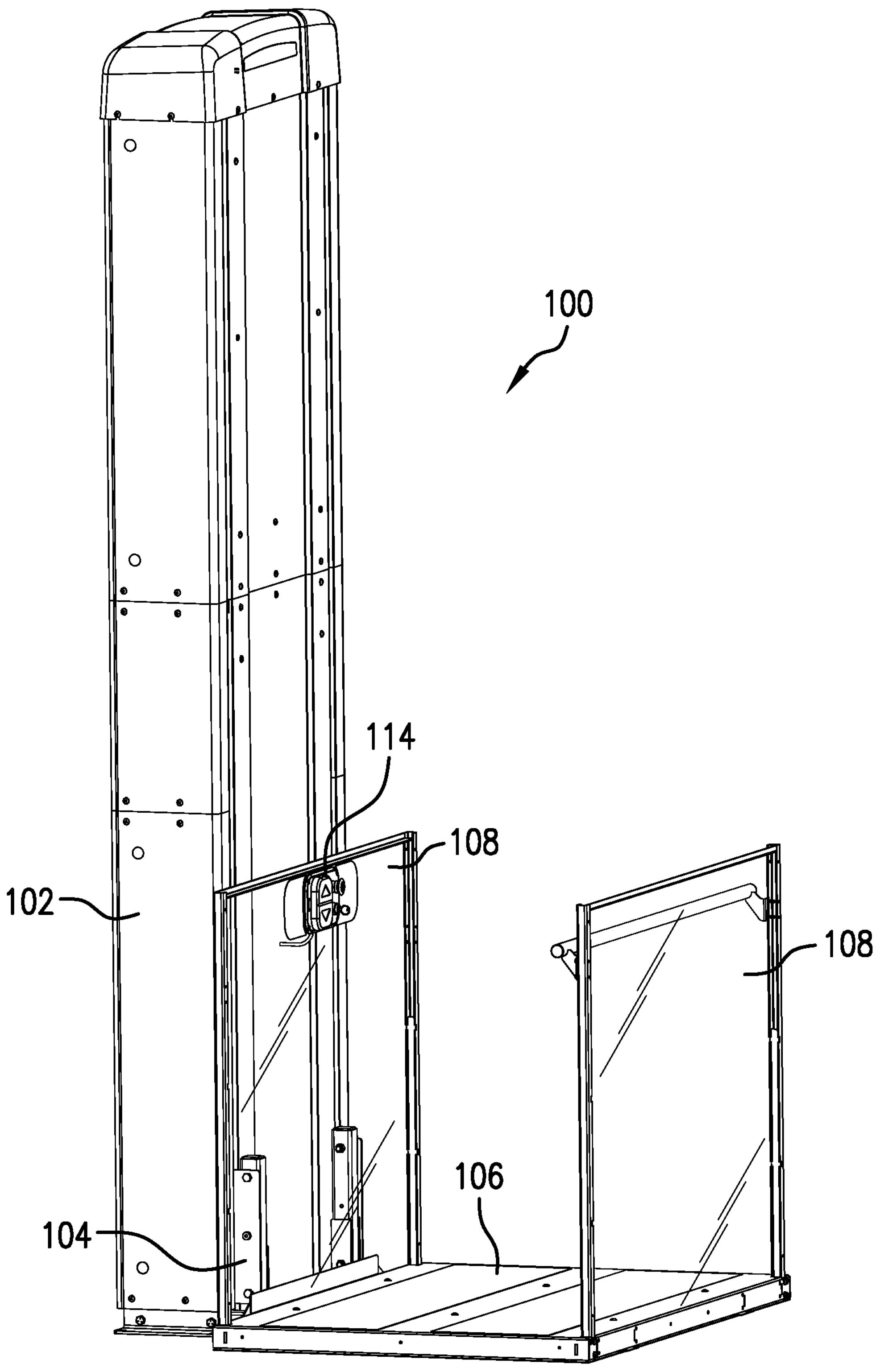
FIGS. 1A-B shows an example vertical platform lift that may be used to implement example features described herein.

In the following description, reference is made to the accompanying drawings, which form a part hereof, and in which are shown various examples of how the disclosure may be practiced. Other examples may be utilized, and structural or functional modification may be made, without departing from the scope of the present disclosure.

Vertical platform lifts (VPLs) may provide benefits to individuals who require mobility assistance. The installation of a vertical platform lift may greatly increase mobility for those who use mobility assistance devices or otherwise have difficulty navigating stairs and other non-uniform surfaces. VPLs may raise or lower a user without requiring that they leave their mobility assistance device. A VPL may allow a user to drive their mobility assistance device directly onto a platform of the VPL.

VPL control systems may use point-to-point wiring systems and electromechanical relays. However, VPLs that utilize point-to-point wiring systems and electromechanical relays for their control system may be challenging to manufacture, troubleshoot, and repair. These wiring and relay system may require many wires and relays to implement, increasing the complexity of the control system.

While operating a VPL may be simple, troubleshooting a VPL control system based on point-to-point wiring and relays may much more challenging. In some examples, it may be difficult to run device diagnostics on VPLs to determine the source of an issue, and may oftentimes require a multimeter, opening circuits, or adding jumpers to isolate problematic areas. This process of using a multimeter, opening circuits, and adding jumpers to circuits one at a time, may be time consuming. While performing diagnostics on the VPL control system, a technician may open a circuit or add a jumper that bypasses a safety circuit. If the technician fails to return the safety circuit to operation, such as, for example, by forgetting to close a circuit they opened or remove a jumper that bypassed a safety circuit, a user of the VPL may be injured due to the inactive safety circuit.

The VPL control system may be improved by replacing some of the point-to-point wiring and electromechanical relays with a processor-based control system. A processor-based VPL control system may have the benefit of implementing a service mode that provides the ability to disable certain safety circuits or functions that allow a technician to troubleshoot the VPL. In some examples, the service mode may include a timer that automatically exits the service mode after a pre-set time period, enabling the safety circuits and functions.

A VPL using a point-to-point wiring and electromechanical relay control system may not provide notice to a user when maintenance should be performed. Over time, the parts of a VPL may begin to wear and require maintenance. However, a user may not know that maintenance is required if the VPL does not provide an indication that maintenance is needed.

An improved VPL relay control system may provide storage to record historical performance data based on sensors measuring data an information about the VPL. The improved VPL relay system may use a processor to compare the current performance and past performance of the VPL to determine if maintenance is needed. The VPL control system may have an indicator system that can inform a user when maintenance is needed. For example, the indicator system may use various LEDs to indicate the VPL status and need for maintenance to the user.

If a VPL control system using a point-to-point wiring system and electromechanical relays whose motor draws too much current (e.g., due to a fault or an overloaded platform), a circuit breaker may trip, leaving a user stuck between levels. If the circuit breaker is not within easy reach of the VPL platform, the user may be stuck until outside help arrives. An improved VPL system control system is described herein and may consist of sensors to monitor performance of the VPL such as, for example, current draw of the motor with a current sensor. The VPL control system may be able to, based on the current draw of the motor, determine a fault condition and indicate the status of the fault condition to the user with the indicator system. The control system may enable the user to correct the fault condition without getting stuck on the platform. For example, after indicating the status of a fault condition (e.g., an overloaded platform), the control system may stop the platform from moving up, but may enable movement of the platform down to a lower landing. By enabling the platform to move to a lower landing, an otherwise stuck user may exit the platform. Thereafter the fault condition may be corrected.

FIG. 1A shows an example vertical platform lift 100 that may be used to implement example features described herein. The vertical platform lift may have a tower 102. The tower 102 may have a lift mechanism 104 mounted to the tower 102 (e.g., inside the tower 102). The lift mechanism 104 may support a platform 106. One or more portions of the lift mechanism 104 may be movable relative to the tower 102, such that the lift mechanism 104 may raise and/or lower the platform 106 along the tower 102.

The platform 106 of the vertical platform lift 100 may support users, including an individual in a mobility assistance device such as, for example, a power chair, wheelchair, or scooter. The platform 106 may have a ramp (not shown) to enabled mobility assistance devices to enter and exit the vertical platform lift. In some examples, the ramp may be a folding ramp that may be configured to automatically fold (based on a mechanism controlled by a control system) after a user enters the platform 106, or before the platform 106 moves. In some examples, the ramp may be configured to fold in an upward position and act as a barrier to keep the mobility assistance device on the platform 106.

In some examples, the platform 106 may comprise sidewalls 108 and/or a gate or door (not shown) to ensure the mobility assistance device remains on the platform 106. The platform 106 may comprise various configurations of sidewalls 108, gates, and/or doors. The platform 106 shown in FIG. 1A is a first configuration comprising two sidewalls 108 opposite each other, enabling a user to enter from one side of the platform 106 and exit on an opposite side of the platform 106. A second configuration may comprise a same side enter-exit configuration. The example same side enter-exit configuration may have three sidewalls 108 configured to have a single opening to allow the user to enter or exit. A third configuration may comprise a 90 degree enter-exit configuration. The example 90 degree enter-exit configuration may have two sidewalls 108 adjacent each other and forming a corner, and may enable the user to enter from one side of a platform and exit by turning 90 degrees to the other open side of the platform. A person of ordinary skill in the art would appreciate other configurations may be utilized.

The VPL 100 may have a control system (not shown in FIGS. 1A-1B) that may control the operation of the VPL 100. The control system may have a cab controller 114 that may allow user input to the VPL control system while on the platform 106. The cab controller 114 may be mounted in the VPL 100 so the user may access the cab controller 114 while using the VPL 100. In some examples, the cab controller 114 may be mounted one of the sidewalls 108.

Figure 1B:
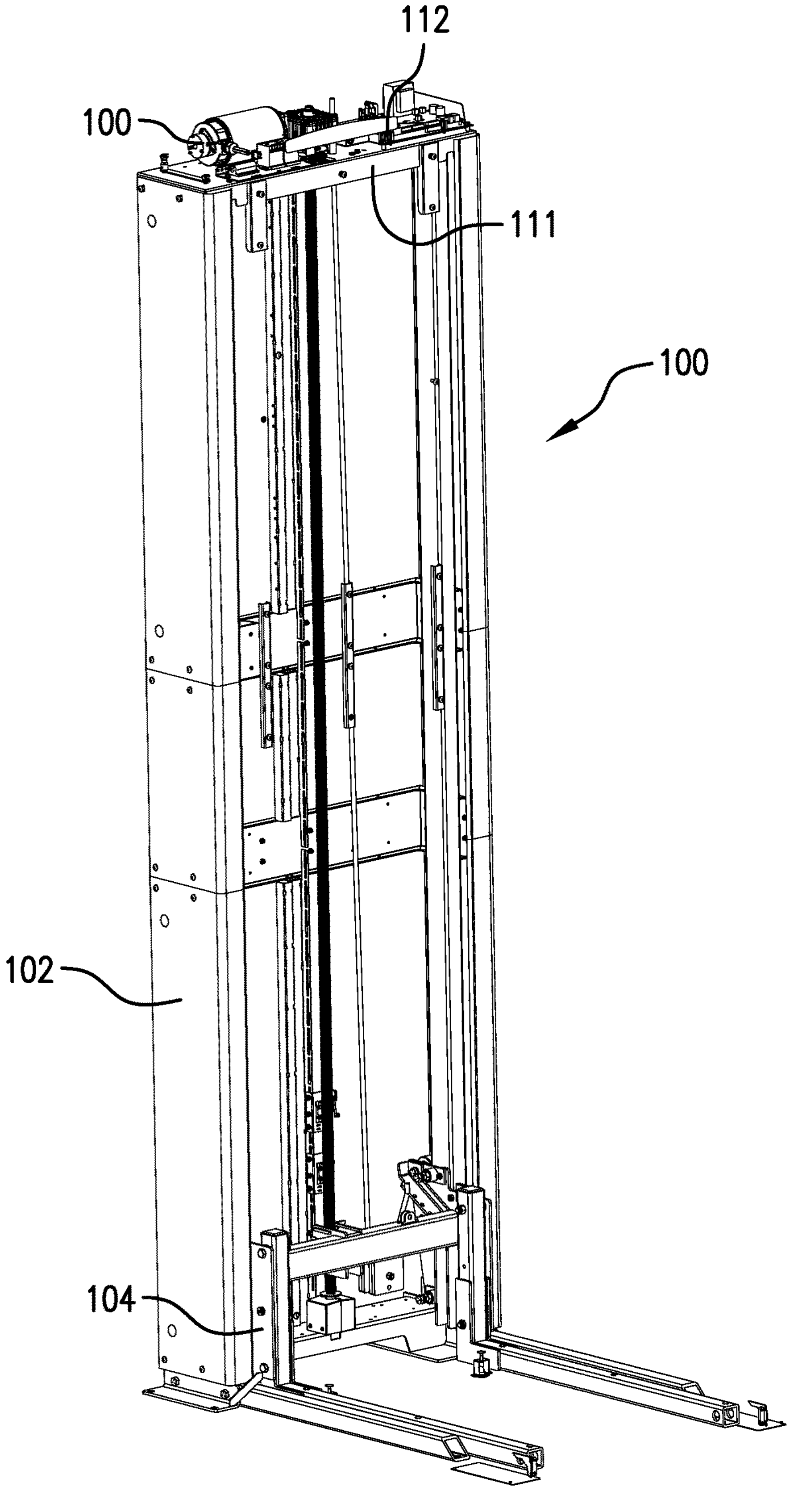

The lift mechanism 104 of the vertical platform lift 100 may be attached to a drive assembly 110 as shown in FIG. 1B. The example drive assembly 110 may comprise any kind of motor capable of moving the lift mechanism 104, such as, for example, an electric motor. In some example, the motor may be powered by direct current from a rectifier (not shown) connected into a power outlet.

The tower 102 of the VPL 100 may be supported by a frame 111. A control system 112 of the VPL 100 may, in some examples, be mounted at the top of the frame 111. The control system 112 may instruct the drive assembly 110 to move the platform 106 of the VPL 100.

Figure 2:
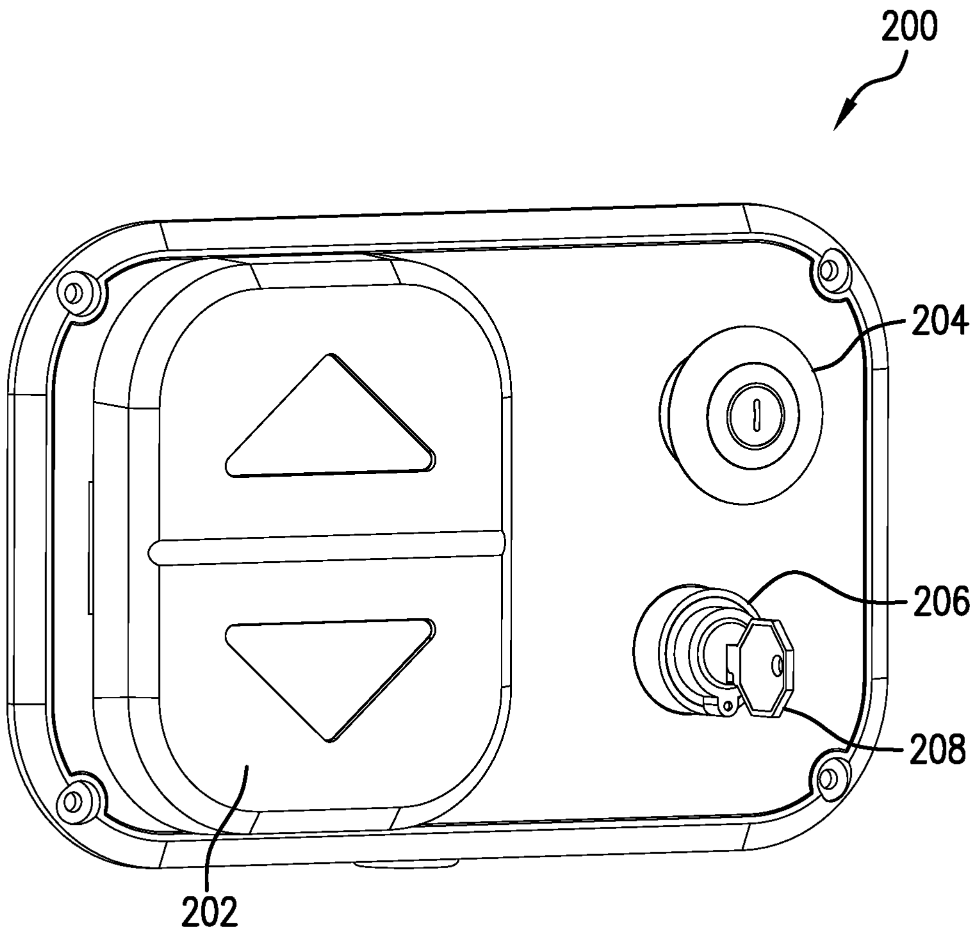
FIG. 2 shows an example vertical platform lift cab controller that may be used to implement example features described herein.

A cab controller 200 may have a switch 202, such as a paddle switch as shown in FIG. 2, to indicate the desired direction of travel. The switch 202 may be depressed in either an upwards or downwards direction, corresponding to the direction the user wants the lift to move. The cab controller 200 may send a signal to the control system 112 based on the direction the switch 202 is depressed. In some examples, the switch 202 may be a constant pressure switch (e.g., to comply with regulations), wherein pressure may be continuously applied to the switch to keep the platform 106 moving. In some such examples, the control system 112 may be configured to stop and/or reverse the platform 106 when the pressure paddle is not being depressed.

The cab controller 200 may comprise an emergency stop button 204 (e.g., to comply with regulations). The emergency stop button may, when pressed, remove power from the control assembly. The control system 112 may cause an indicator system to sound an audible alarm signal based on a signal received from the emergency stop button. Triggering the emergency stop button 204 may also disable movement of the platform 106. The cab controller 200 may also have a key switch 206. If equipped with a key switch, the VPL 100 may be configured to operate only when a key 208 has actuated the key switch. The key switch 206, when unactuated, may remove power from the control assembly. The key switch 206, when unactuated, may still allow platform movement from a landing controller.

In some examples, the cab controller 200 may comprise multiple (e.g., three) switches (not shown), which may correspond to different landings that the VPL 100 can access. The switches for a multiple landing VPL 100 may also be momentary switches that engage when depressed.

Figure 3A:
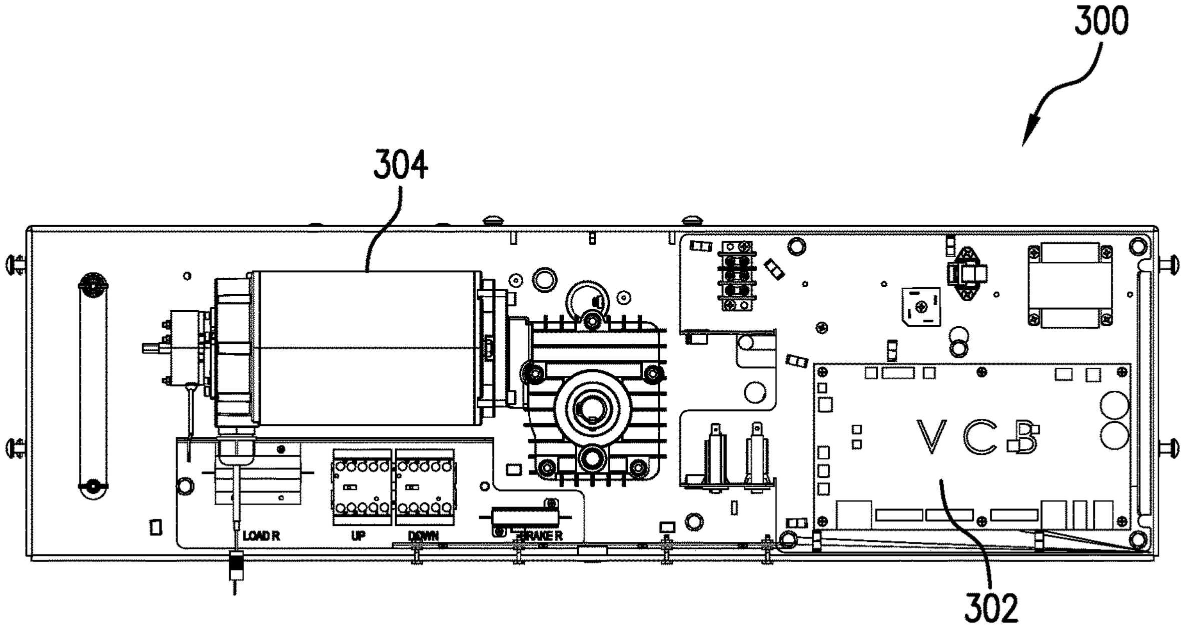
FIGS. 3A-B show an example portion of a vertical platform lift that may be used to implement example features described herein.
Figure 3B:
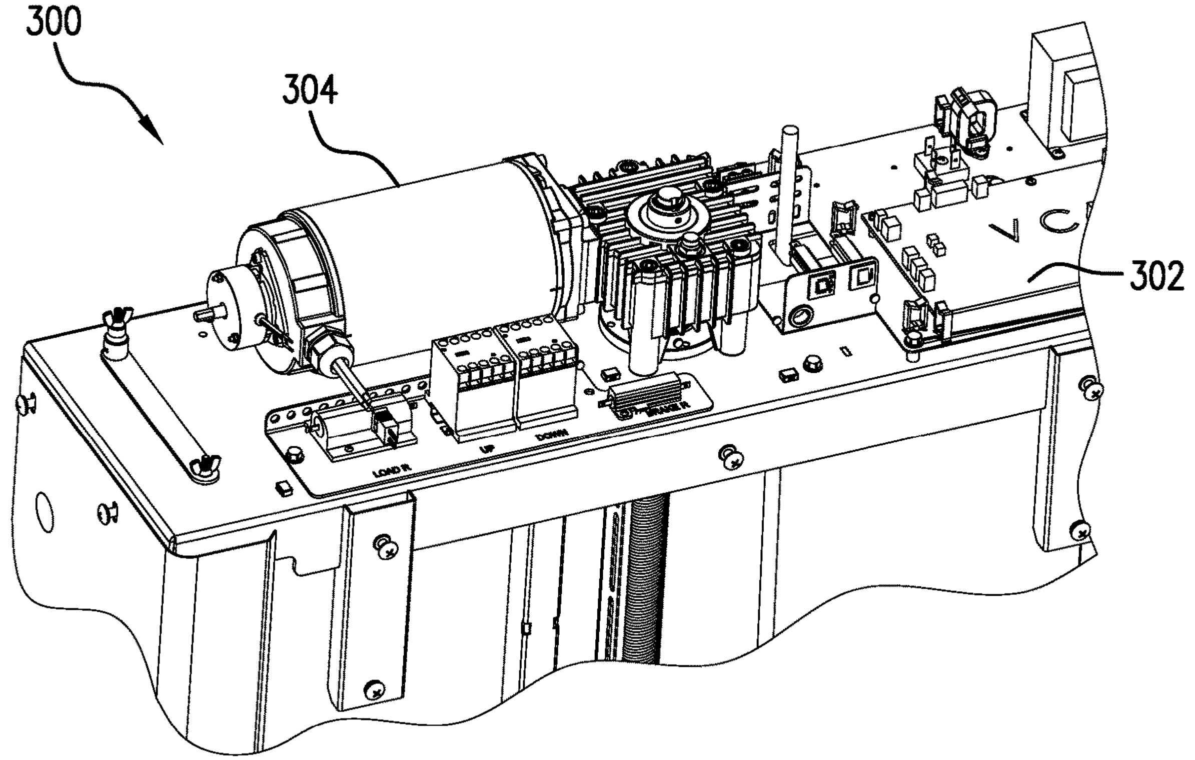

A control system control circuitry 302 may be mounted at the top of a VPL frame 300 near a drive assembly 304 as shown in FIGS. 3A and 3B. The control circuitry 302 may have connection ports that allow for input and output to the control circuitry 302. The control circuitry 302 may have one or more processors that can access the control circuitry connection ports. The control circuitry 302 may also have memory or storage that is accessible by the CPU. The control circuitry 302 may have control circuit logic that is connected to the connection ports and is configurable, using configurable links, on the control circuitry 302.

Figure 4:
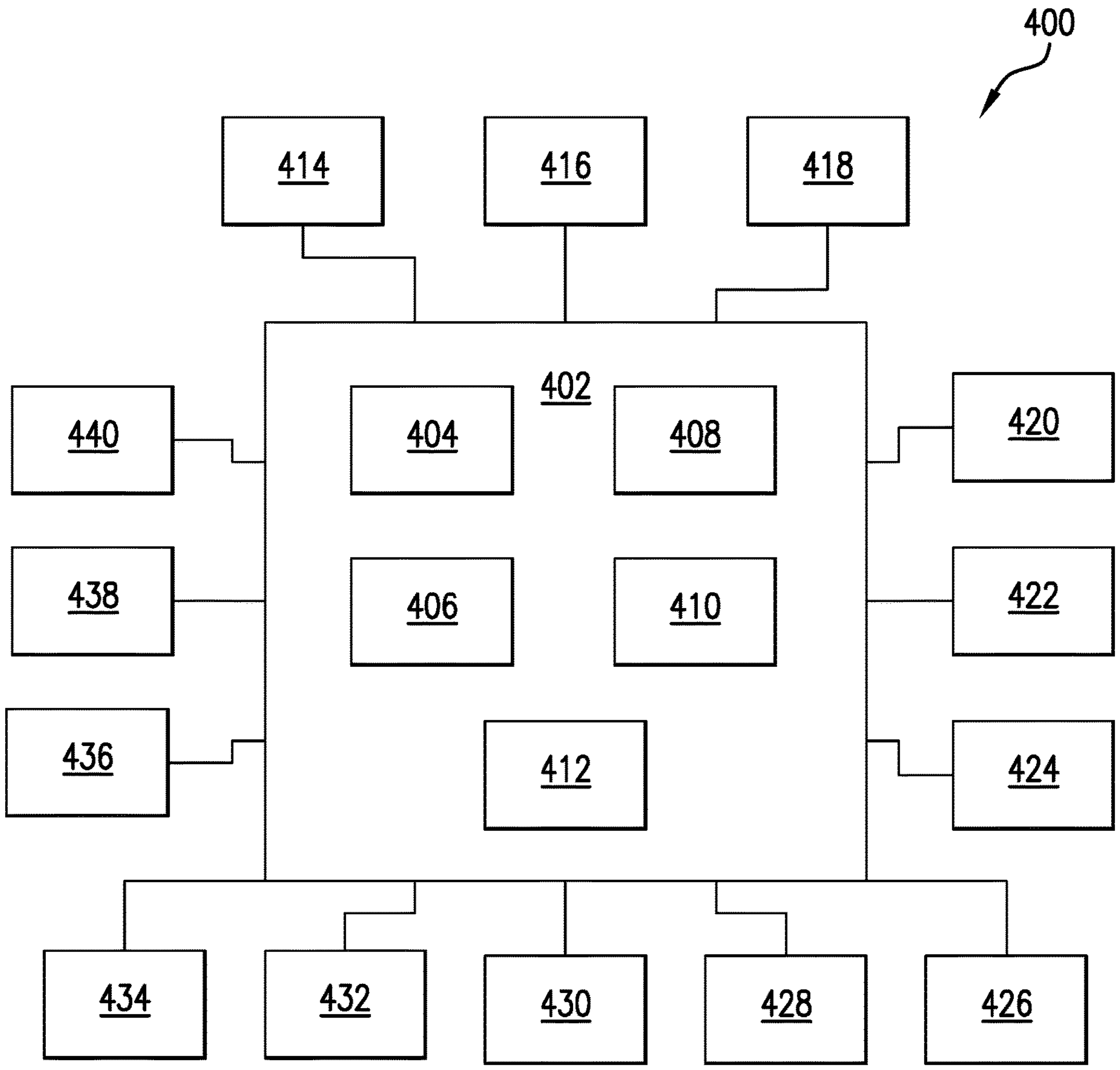
FIG. 4 shows part of an example vertical platform lift that may be used to implement example features described herein.

A control system and associated sensors 400 may comprise control circuitry 402, such as, for example, a printed circuit board (PCB) as shown in FIG. 4. The control circuitry 402 may have one or more processors 404, memory 406, and an indicator system 408. The control circuitry 402 may have configuration inputs 410 for control circuitry 402 customization. The control circuitry 402 may also have a service switch 412. The control circuitry 402 may be connected to a number of inputs and outputs, including, without limitation: temperature sensor(s) 414, current sensor(s) 416, platform load sensor(s) 418, safety nut switch(es) 420, float switch(es) 422, expansion port(s) 424, cab controller 426, secondary indicator system 428, landing switch(es) 430, landing lock solenoid(s) 432, power door opener(s) 434, pit switch(es) 436, call-send switch(es) 438, and safety pan switch(es) 440.

In some examples, the control circuitry 402 may be configurable using configuration inputs 410. The configuration inputs 410 may be used at the time of manufacture to set options for the VPL control system 112. In some examples, the configuration inputs 410 may be configured using cut-able links on the control circuitry 402 or jump wires. Links on the control circuitry 402 may be cut to disable a circuit or modify the operation of the VPL, e.g., set the number of landings, enable a toe guard, or enable an auxiliary sensor. A circuit that has been disabled by cutting the link on the control circuitry 402 may require soldering to reconnect the link. In examples that use the cut-able links, it may deter tampering and may allow technicians to assess if the control circuitry 402 has been changed from an original configuration.

In some examples, the VPL 100 may have an indicator system that may indicate information received from the control system 112 using visual or audio communication. The indicator system may display the status of one or more circuits associated with the VPL 100. The indicator system may use, for example, labeled LEDs to indicate the status, e.g., whether the circuit is open or closed, of a circuit associated with the LED. The LEDs of the indicator system may be labeled to indicate the circuit whose status the LED is associated with. The indicator system may be built into the control circuitry 402, or it may be separate from the control circuitry 402 and connected through an input/output connection port. In some examples, the indicator system may have an alarm that may be used to indicate high priority messages, such as if a major fault occurs.

The indicator system may not be easily accessible by a VPL user if it is connected to the control circuitry 402. The indicator system may be useful for a technician working on the VPL 100, but limited accessibility may limit the indicator system's use by a typical user. The VPL 100 may have a second indicator system, mounted remotely from the first indicator system such that the second indicator system is more easily seen by the user. The second indicator system may be mounted, for example, on or by the tower 111 or the cab controller 426, enabling the user to see the second indicator system while operating the VPL 100. The second indicator system may, for example, be LEDs, and may duplicate what is shown by the first indicator system.

The first indicator system and the second indicator system may contain bi-color LEDs that produce red, green, and yellow or orange light. The LEDs may use combinations of on/off, color, and steady/flashing to indicate status conditions. Additionally, groupings of various combinations of LEDs and the location of the LEDs may be used to indicate status conditions. Categories of conditions may be grouped according to the LED color (e.g., any red LED may indicate a major fault).

An audible alarm may be part of the indicator system, and may be triggered in situations such as when an emergency stop button is triggered. The indicator system may also provide visual indicators to indicate that there are no conditions preventing use of the VPL 100, that a potentially unsafe condition has been detected, or to provide guidance to service personnel in performing maintenance on the VPL 100.

Based on the severity and probability level of the conditions monitored by the control system 112, the indicator LEDs may indicate alarm priority levels by color, e.g., yellow for lower levels and red for higher levels, and flashing, with flashing indicating a higher priority level. For example, a low probability with a negligible severity alarm may be indicated by a solid yellow LED, whereas a high probability significant severity alarm may be indicated by a flashing red LED.

A high priority alarm (typically flashing red) may require trained service personnel to address and access a service mode to clear the alarm. A medium priority alarm (typically flashing yellow) may cause restricted movement of the platform 106 or locking out movement of the platform 106 until the alarm is corrected. These alarms may or may not require trained service personnel, and may be caused by switches like a safety pan or float switch. Low priority alarms (typically solid yellow) are typically notifications of user correctable faults that may prevent platform movement or that a condition otherwise exists that should be corrected.

The control system control circuitry 402 may be connected to one or more sensors to measure the status and condition of various parts of the VPL 100. In some examples, the drive assembly may be connected to a temperature sensor 414 and/or a current sensor 416. Sensor data such as, for example motor temperature and motor current draw may be used by the control system 112 to determine if the VPL 100 is operating outside design parameters. For example, motor temperature that is above a set threshold may be indicative of overheating, may indicate that the motor requires maintenance. Alternatively, a very low temperature such as, for example, below −73° C., may indicate that the temperature sensor is faulty or unplugged.

If the motor current or temperature moves outside of desired data ranges, the control 112 system may determine a fault condition and change the operation of the VPL 100. The control system 112 may then use an indicator system to indicate, to the user, the fault that has occurred. The temperature of the drive assembly may indicate that the drive assembly may need maintenance or that the platform 106 is overloaded. Similarly, a current sensor may be used to measure the current draw of the drive assembly. A change in current to the drive assembly could also be a sign that maintenance is needed or that the platform 106 is overloaded.

During a minor fault condition, the control system 112 may enable safeguards to protect the user and the VPL 100. For example, the control system 112 may prevent upward movement by the VPL 100 until the low or medium priority fault condition is resolved. In another example, the control system 112 may stop the motor during a high priority fault condition, or may increase the duty time, the time between when a platform 106 reaches the bottom landing before it can move up again. The VPL 100 may, during some fault conditions, allow for the platform 106 to be lowered to a lower landing, so that the user may safely exit the platform 106.

The control system 112 may use a qualitative analysis of the signals monitored by the control system 112 to set fault conditions based on the severity and probability of any risks or harm. The severity levels may be split into significant, moderate, and negligible. Significant indicates loss of function, where continued operations of the lift may result in injury. Moderate indicates partial loss of function, where direction of travel is restricted to prevent placing the occupant or other individuals in a potentially hazardous situation. Negligible indicates that functionality is inhibited until a safety interlock is corrected and that the lift will not cause injury. The probability is split between high, indicating likely to happen, low, indicating can happen, but not frequently, and low, indicating unlikely to happen, rare, or remote.

Figure 5:
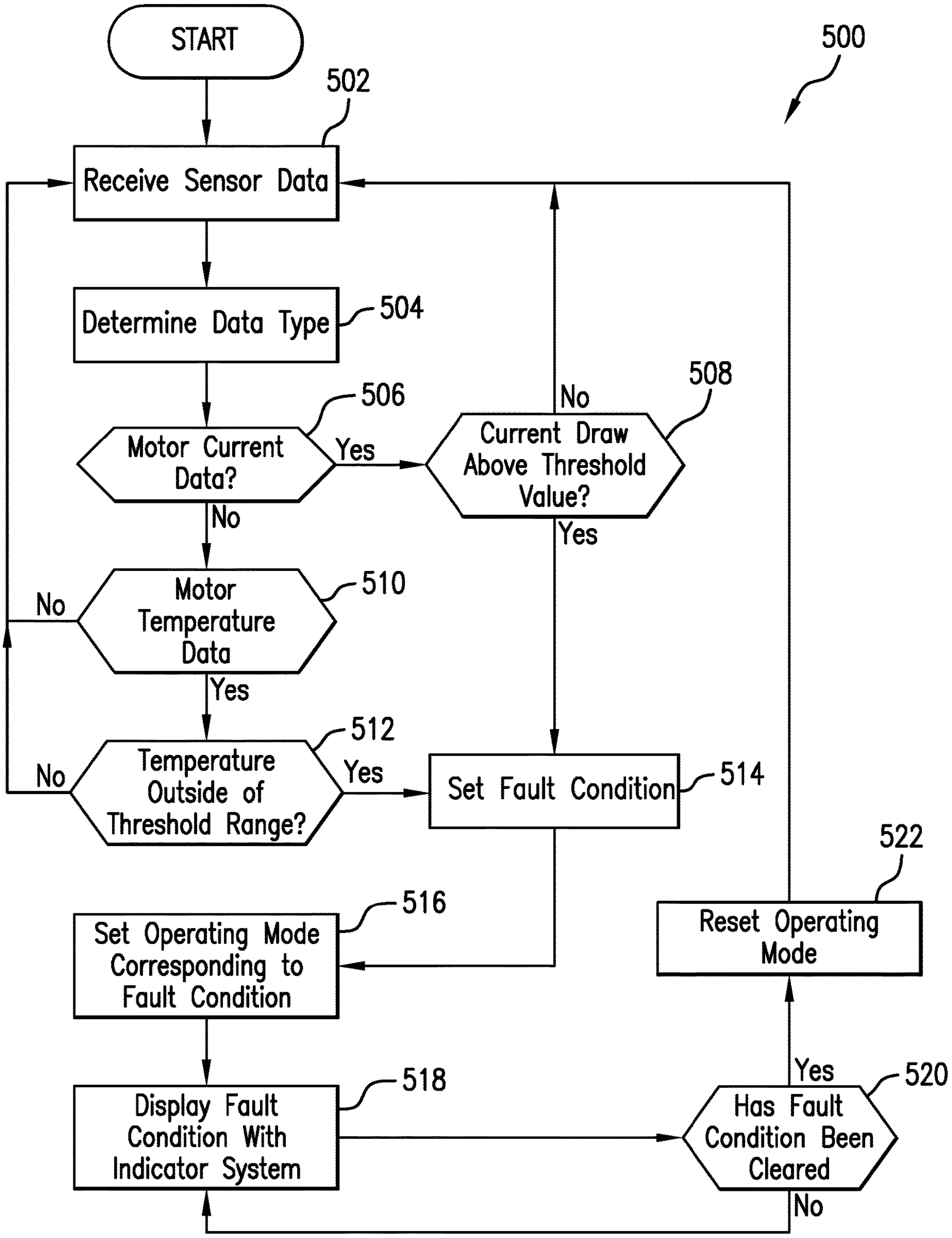
FIG. 5 is a flow chart showing an example method for a vertical platform lift control system monitoring some example sensors and determining fault conditions based on the sensor data.

FIG. 5 is a flow chart showing an example process 500 of a VPL control system 112 monitoring some example sensors and determining fault conditions based on the sensor data. In step 502, the control system 112 may receive sensor data from the sensors. The control system 112 may determine the type of data being received based on the sensor type (step 504). If the data is from a motor current sensor (e.g., current data) (step 506: YES), the data may be compared to a current threshold value (step 508). The control system 112 may set a fault condition (step 514) if the current draw satisfies (e.g., meets or exceeds, for example, 10.5 amps, for a 12 amp motor, for more than 25 ms) a threshold current value (step 508: YES). If the current draw does not satisfy (e.g., is below) the threshold value (step 508: NO), the control system 112 may determine that the current draw may be within an acceptable range and the process may return to step 502 continue monitoring the VPL sensors.

If the data is not from a motor current sensor (step 506: NO), the control system 112 may check if the sensor data is temperature data from a motor temperature sensor (step 510). If the data is from a motor temperature sensor (step 510: YES), the control system 112 may compare the motor temperature to a threshold range of temperatures (step 512). The control system 112 may set a fault condition (step 514) if the motor temperature within an unacceptable threshold range of values (step 512: Yes). If the motor temperature is within an acceptable range of temperatures (step 512: NO), the process may return to step 502 and continue monitoring the VPL sensors.

After the control system 112 sets a fault condition (step 514), the control system 112 may set an operating mode corresponding to the fault condition (step 516). The operating mode may change how the control system 112 operates the VPL 100. In some examples, operating modes may include Service Required or Out-of-Service, which may change the operation of the control system 112 by, such as, for example, stopping the motor and platform 106, limiting the platform 106 from moving up, or increasing the duty cycle. Increasing the duty cycle may increase a timer that the VPL control system 112 waits between trips upwards on the VPL platform 106.

The control system 112 may, based on the fault condition, use an indicator system to display the fault condition (step 518). The indicator may, for example, use colored LEDs to indicate the type and severity of the fault condition. The control system 112 may check to see if the fault condition has been cleared (step 520). If the fault condition has not been cleared (step 520: NO), the control system 112 may return to step 518 and continue displaying the fault condition with the indicator system. Depending on the type and severity of the fault condition, fault conditions may clear themselves or may need to be cleared by a user or technician. After the fault condition has been cleared (step 520: YES), the control system 112 may reset the operating mode, removing any limitations placed during step 516 (step 522). After resetting the operating mode, the control system 112 may continue monitoring the sensors at the beginning of the flow chart.

Figure 6:
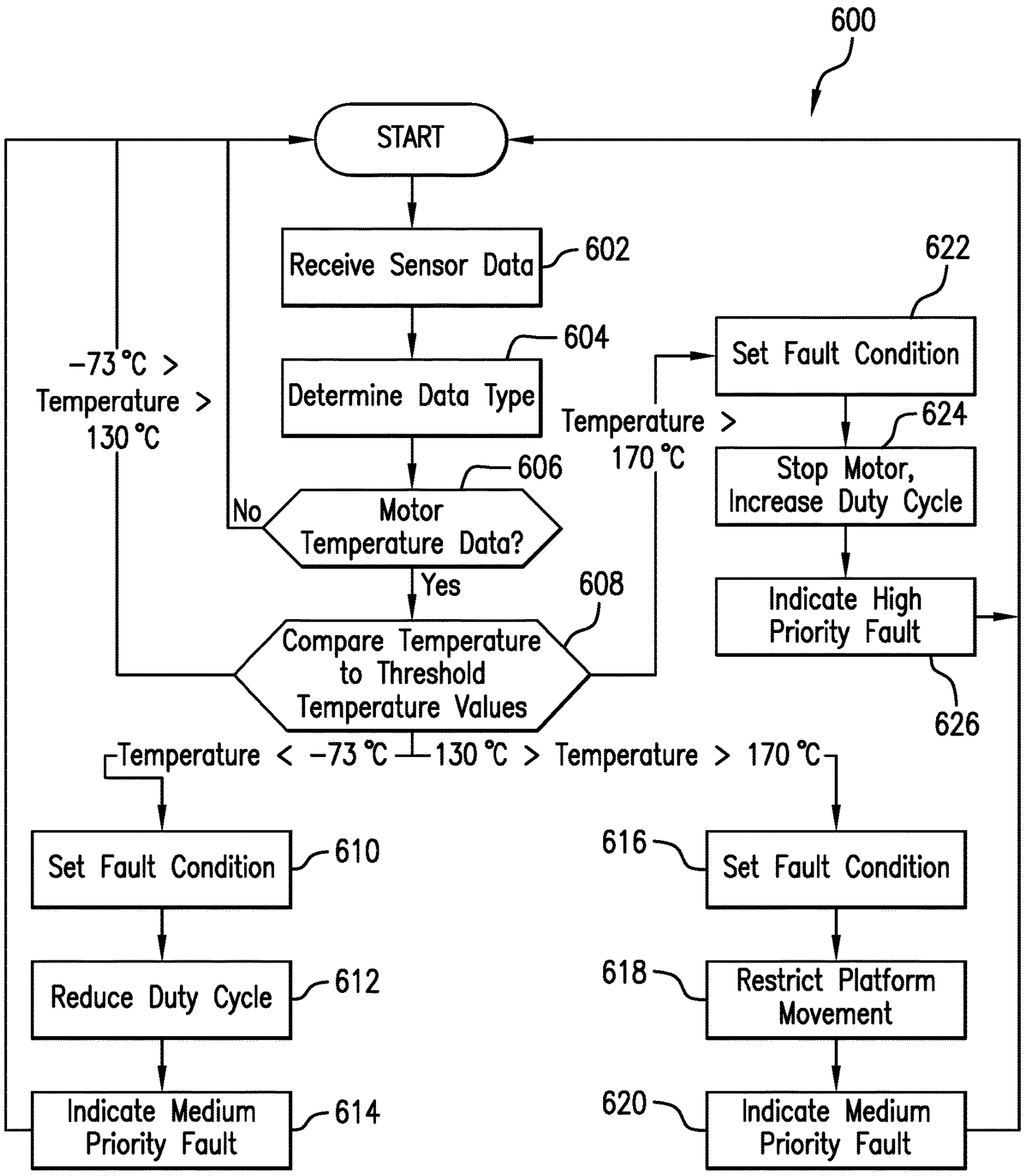
FIG. 6 is a flow chart showing an example method for a vertical platform lift control system monitoring an example temperature sensor and determining fault conditions based on the temperature data.

FIG. 6 shows a flow chart of a more specific example of a method 600 for monitoring the temperature of the VPL motor. The example method 600 uses example temperatures that may be changed based on the application. The control system 112 may receive sensor data (step 602) from one or more sensors such as, for example, the temperature sensor 414 or the current sensor 416. The control system 112 may then determine the type of data being sent by the sensor based on the type and location of the sensor (step 604). The control system 112 may then determine if the sensor data is temperature data from the motor temperature sensor (step 606). If the data is not motor temperature data (step 606: NO), the control system 112 may return to the beginning.

If the data received is motor temperature data (step 606: YES), the control system 112 may then compare the temperature to a threshold temperature values (step 608). If the temperature is below −73° C. (step 608: Temperature<−73° C.), the control system 112 may set a fault condition (step 610). The control system 112 may determine, based on the temperature below −73° C., that the temperature sensor 414 is broken. The control system 112 may reduce the duty cycle by increasing the amount of time between when the platform 106 reaches the bottom landing before it can go up. (step 612). The control system 112 may then indicate a medium priority fault using the indicator system (step 614). The control system 112 may then return to the beginning of the flow chart and continue monitoring the sensor data.

A temperature between −73° C. and 130° C. may indicate that the temperature of the motor is within an acceptable operating temperature range (Step 608: −73° C.>Temperature>130° C.). The control system 112 may then return to the beginning of the flow chart and continue monitoring the sensor data.

A temperature between −73° C. and 130° C. (Step 608: 130° C.>Temperature>150° C.) may cause the control system 112 to set a fault condition (step 616) and restrict platform movement (step 618). Restricting the platform 106 from moving upwards may allow the motor to cool down when overheated. The control system 112 may then indicate a medium priority fault using the indicator system (step 620). The control system 112 may then return to the beginning of the flow chart and continue monitoring the sensor data.

A temperature above 170° C. (Temperature>170° C.) may cause the control system 112 to set a fault condition (step 622). High motor temperature may be an indication that something is wrong with the VPL 100. The control system 112 may then set a fault condition (step 622) then stop the motor and increase the duty cycle (step 624). The control system 112 may then indicate a high priority fault using the indicator system (step 626). The control system 112 may then return to the beginning of the flow chart and continue monitoring the sensor data. The temperature ranges provided in the FIG. 6 flowchart are shown as examples, and may be differ based on the application.

VPL sensors may be used to prevent safety systems from being bypassed, either purposefully or by accident. The control system 112 may also use the current draw of the drive assembly to prevent control latching. VPLs 100 may use constant pressure switches to prevent a platform 106 from moving after a user stops applying pressure to the switch. Switch latching occurs when a switch maintains an active state after removing pressure from the switch. For switches in a cab controller 426, switch latching may be dangerous if the platform 106 continues to move after the user removes pressure from the switch.

The VPL control system 112 may detect control latching based on a comparison of data from a motor current sensor and the status of a cab controller 426 and a landing call controller. It is a sign of control latching if the current sensor indicates that the drive assembly is drawing current without any buttons being pressed on the cab controller 426 or on a landing call controller. The control system 112 may set a fault condition if control latching is detected.

Alternatively, if a motor current sensor indicates that the motor is not drawing current while a button on the cab controller 426 or landing call controller is pressed, the current sensor may be unplugged or bypassed, and the control system 112 set a fault condition.

If the data from the temperature sensor is outside of a set temperature range, the control system 112 may be able to determine that the temperature sensor is unplugged or bypassed. If the control system 112 determines that a safety system has been bypassed, the control system 112 may indicate set an error condition. Each error condition may be set to change the operation of the VPL control system 112 and may be indicated using the indicator system.

In addition to the motor temperature monitoring system, ambient temperature may be monitored. Ambient temperature may be used to help identify installations that may require heating blankets for the batteries or may help manage the capacity and health of a battery system by increasing time between trips up during high ambient temperatures, e.g., ambient temperature above 35° C. (95° F.).

Some VPLs may use a belt drive system to move the platform 106. In some examples, the VPL may comprise a belt drive limit switch. The belt drive limit switch may be monitored by the control system 112. The control system 112 may determine, based on the belt drive limit switch, if a drive belt for the belt drive system has failed.

A VPL platform 106 may have a load cell. The load cell may be used to monitor platform weight. The load cell may be connected to the control system 112 to provide platform load information. The control system 112 may use load information to determine, for example, if the platform 106 has been loaded past an allowed capacity. Some VPLs 100 may use multiple load cells such as, for example, when the platform 106 is attached to the lift mechanism with a pair of mounting brackets. VPLs 100 using multiple load cells may have added complexity as compared an elevator using a single load cell on the elevator cable. In examples with multiple load cells, the control system 112 may be used to calculate the platform load using load information provided by the load cells. The control system 112 may set an error condition if it determines that the platform 106 has been loaded above the designed weight capacity.

The VPL control system 112 may feature a service mode to aid in performing maintenance and performing diagnostics. The control circuitry 402 may have an internal service switch to access the service mode. The service mode may enable service functions that may otherwise not be accessed by the control system 112. Service mode may be helpful for a technician attempting to troubleshoot a VPL 100 that needs repair. The extra functions of the service mode may allow the user to perform troubleshooting without manually opening circuits or adding jumpers to isolate problematic circuits.

When performing maintenance, some technicians may use wire jumper to bypass circuits. Some of these circuits may be safety circuits that may be dangerous to a user if left disabled. The service mode may have a timer to automatically exit the service mode after a pre-set time period so that the control system 112 may automatically return to a normal operating mode after service, reenabling the safety circuits. The control system 112 may check if any circuits, such as, for example, the safety circuits, have been manually or otherwise bypassed after exiting the service mode.

In some examples, the internal service switch may be a momentary switch that triggers the service mode for a short period of time, e.g., 15 minutes. It may be expected that servicing the VPL 100 takes more than 15 minutes, and a user may activate the internal service switch multiple times or hold the internal service switch for a predetermined amount of time (e.g., a number of seconds) to reset the service timer. The indicator system may indicate when the VPL 100 is in service mode.

While the VPL control system 112 is in the service mode, the control system 112 may allow movement as is shown in FIG. 7. The control system 112, while in a service mode, may allow platform movement that may otherwise be locked out due to a safety circuit or a fault condition. The service mode may allow the VPL 100 to move the platform 106 and provide easier access to the electronics area of the lift for improved ease of servicing.

The platform 106 may have a secondary service switch to access the service mode. The secondary service switch may be hidden from the user, such as, for example, inside the cab controller 426. In some examples, the secondary service switch may be a magnetic reed-switch that may be triggered by a magnet outside of the cab controller 426. In some examples, the control system 112 may require other button presses in combination with the magnetic reed-switch to enter the service mode. In some examples, the secondary service switch may be a key switch that may require a key or other specialized tool to activate.

The control system 112 may include an expansion port (not shown) connected to the control circuitry 402. The expansion port may allow for future upgrades to the VPL 100. The expansion port may allow the addition of, for example, memory, storage, and additional communication capabilities. A network interface may be connected using the expansion port to add wired or wireless communication to the VPL control system 112. Some communication methods that the VPL expansion may use include, for example, Wi-Fi, local internet, or a cellular network.

Network communication may allow the VPL control system 112 to communicate with a remote computing device. The VPL control system 112 may use communication with the remote computing device to send data such as, for example, sensor data, stored VPL data, and/or fault conditions. The remote computing device may be operated, for example, by a dealer or technician. The VPL control system 112 may send a notice to the dealer that may indicate that something is wrong with the VPL 100 or that the VPL 100 may require preventative maintenance. The dealer may be able to use the data provided by the VPL control system 112 to the remote computing device to remotely diagnose problems with the VPL. In some examples, the data sent to the remote computing device may enable the dealer to determine the parts necessary to complete a repair of the VPL 100, thereby reducing the number of on-site visits.

The VPL control system control circuitry 402 may have memory or storage to record and store VPL data, such as historical lift performance from the sensor data, in a storage device. The memory may be installed from the factory, or may be added using the expansion port. The VPL 100 may monitor and record the time it takes the lift to move between landings. An increase in travel time may indicate that performance is degrading to the point which a technician should service the VPL 100. Other performance characteristics that may be monitored include: the time for the platform 106 to go from the bottom landing to the top landing, the time for the platform 106 to go from the top landing to the bottom landing, and the sum of the up and down transit times.

Historical data of the motor current and motor temperature may also be stored and compared to current sensor data to monitor performance of the lift. If the control system 112 determines that lift performance has degraded past a certain threshold, the control system 112 may indicate a service required message using the indicator system. The control system 112 may also limit upward movement by the VPL 100 or remotely contact a technician or vendor to provide notice of the decreased performance. The performance threshold may be preset and programmed into the control system 112, or may be set by an algorithm based on historical performance data. The control system 112 may set a fault condition and stop operating if the VPL performance continues to degrade or after a set period of time after indicating the service required message.

The control system 112 may monitor for change using a moving average filter to determine if there is a potentially significant change from when the lift was first installed or last serviced. Proper initial parameters for the moving average filter for the performance monitoring is important to achieve high sensitivity to real issues while minimizing false alarms. The variables that can be changed include the maximum filter size, the initial dead band, and the trigger variation.

The VPL control system 112 may record other operational data in storage. The control system 112 may record the in-service hours and the number of hours the lift was AC powered and available for use. The control system 112 may record inverter data, e.g., inverter hours, the total in service hours the lift was operating on battery, total number of cycles operated on battery, time stamps for the most recent trips the platform 106 moved up, and the time stamps for low and very low battery statuses. The time stamps for recent trips and low and very low batteries may be cleared when both the VPL 100 loses power and the most recent up trip occurred over 12 hours prior to the current time. The VPL control system 112 may also record the number of cycles for monitoring to determine when maintenance should be performed. The number of cycles may trigger a service required flag or an out of service flag.

Figure 8A:
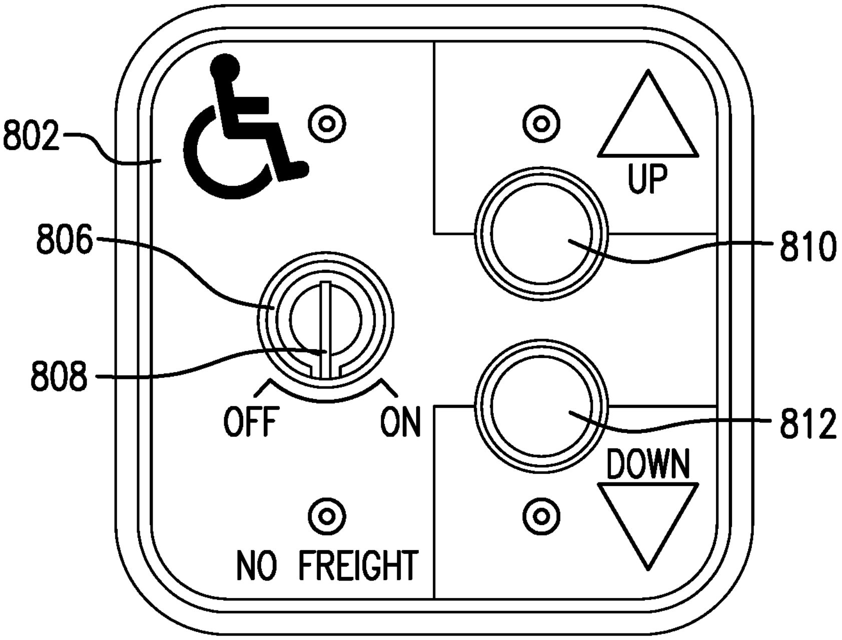
FIGS. 8A-E show example vertical platform lift landing controllers that may be used to implement example features described herein.
Figure 8B:
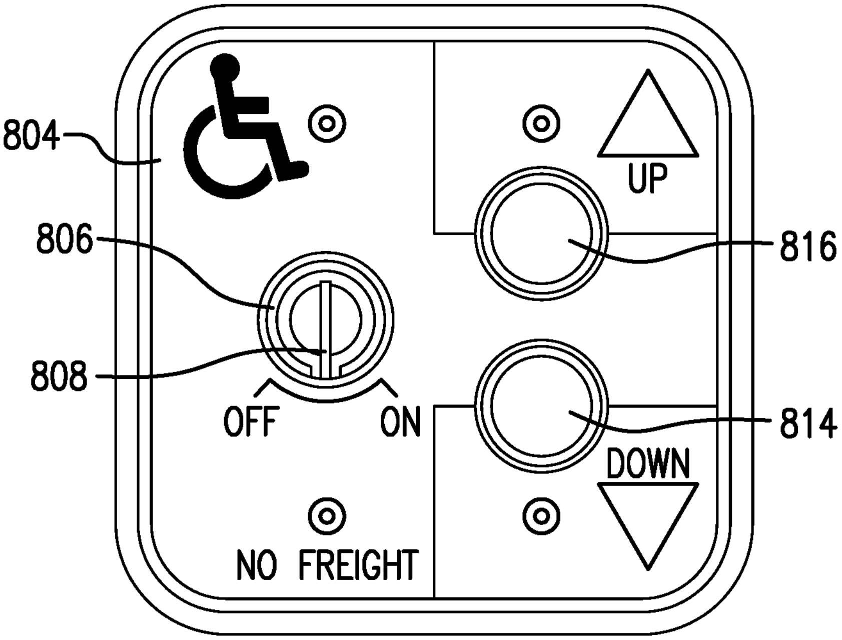

A VPL may have two landing controllers as are shown in FIGS. 8A and 8B. The VPL 100 may have a landing controller associated with and located at each landing. An upper landing controller 802, as shown in FIG. 8A, may be used on at a top landing. The upper landing controller 802 may have a key switch 806. If equipped with a key switch 806, the control system 112 may be configured to operate the VPL 100 only when a key 808 has actuated the key switch. The key switch 806, when unactuated, may remove power from the upper landing controller 802.

A lower landing controller 804, as shown in FIG. 8B may be used at a bottom landing. The lower landing controller 804 may also have a key switch 806. In examples where the lower landing controller 804 is equipped with a key switch 806, the control system 112 may be configured to operate the VPL 100 only when a key 808 has actuated the key switch 806. The key switch 806, when unactuated, may remove power from the lower landing controller 804.

If the control system 112 receives a signal from a landing controller 802, 804 and the cab controller 426 at the same time, the control system may determine which signal takes precedence. In some examples, the control system 112 may determine that a signal from the cab controller 426 takes precedence over a signal from a landing controller 802, 804.

The upper landing controller 802 may have a top landing call button 810 and a top landing send button 812. The control system 112, when it receives a signal from the top landing call button 810, may move the platform 106 to the top landing. The control system 112, when it receives a signal from the top landing send button 812, may move the platform 106 to a lower landing.

The lower landing controller 804 may have a lower landing call button 814 and a lower landing send button 816. The control system 112, when it receives a signal from the lower landing call button 810, may move the platform 106 to the lower landing. The control system 112, when it receives a signal from the lower landing send button 812, may move the platform 106 to an upper landing.

Figure 8C:
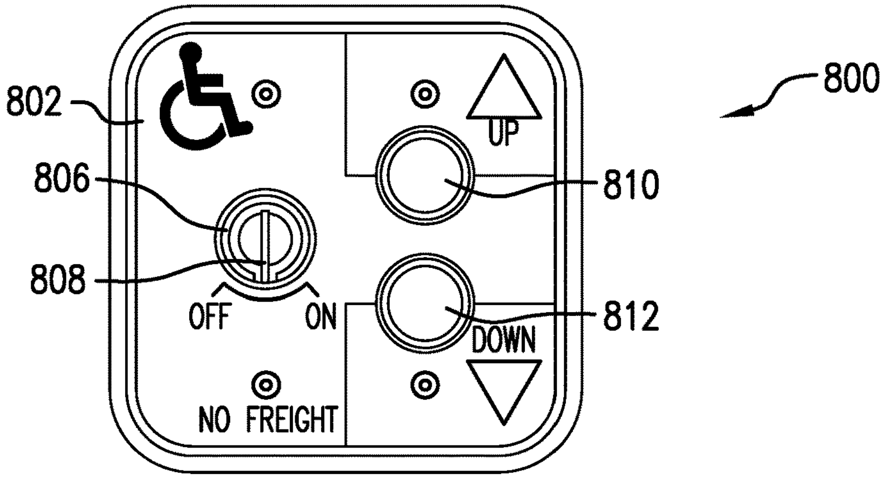
Figure 8D:
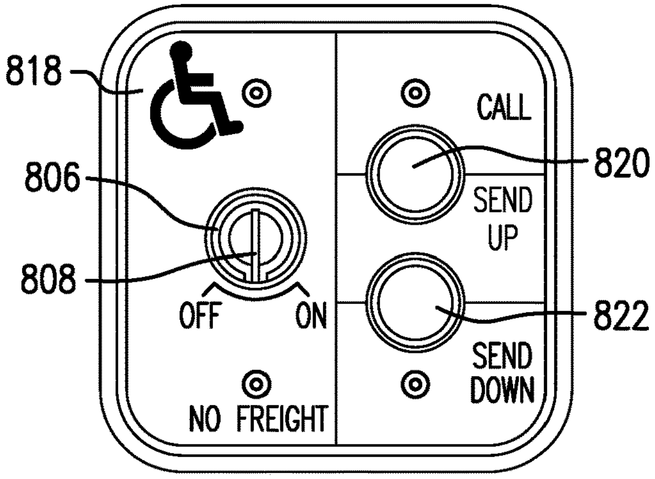
Figure 8E:
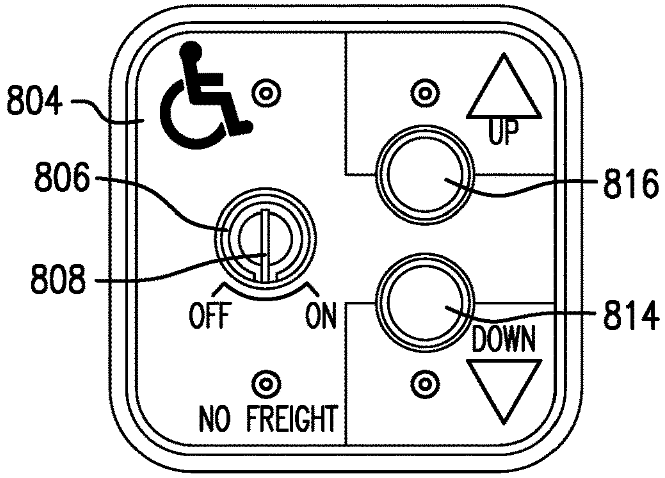

A VPL 100 with three landings may have three landing controllers, as shown in FIGS. 8C-E. In a three-landing VPL configuration, the upper landing controller 802, as shown in FIG. 8C and the lower landing controller 804, as shown in FIG. 8E, may operate similarly to a two-landing VPL configuration. A three-landing VPL configuration may have a middle landing controller 818, as shown in FIG. 8D. The addition of the middle landing controller 818 may provide added complexity to the control system.

The middle landing controller 818 may have a middle landing call button 820 that may signal the control system to send the platform 106 to the middle landing. The middle landing controller 818 may have a middle landing send button 822 that may signal the control system to send the platform 106 to the lower landing. The control system 112 may send the platform 106 upwards if both the middle landing call button 820 and the middle landing send button 822 are pressed at the same time.

A control system 112 for a VPL 100 with three landings may have the added complexity of determining the position of the platform 106 before moving the platform 106 in response to a signal from a landing controller. For example, for a two landing VPL 100, the platform 106 is either located at the same landing as the user, or the landing without the user. The control system 112 for a three landing VPL 100 may be more complicated due to the middle landing. In some examples, e.g., when a VPL 100 is located in a hoistway, the user may not be able to see the location of the platform 106. When the platform 106 is called by the middle landing controller 818, the control system 112 may need to determine the location of the platform 106 relative to the user before moving the platform 106. The control system 112 may store the location of the platform 106. The control system 112 may use the stored location of the platform 106 to determine if the platform 106 is above or below the user and move the platform 106 in the correct direction. For example, if the platform 106 is at the top landing, and a user at the middle landing presses the middle landing call button 820, the control system 112 may determine, based on the stored location of the platform 106, that the platform 106 should be send down one level to reach the middle landing.

Figure 9:
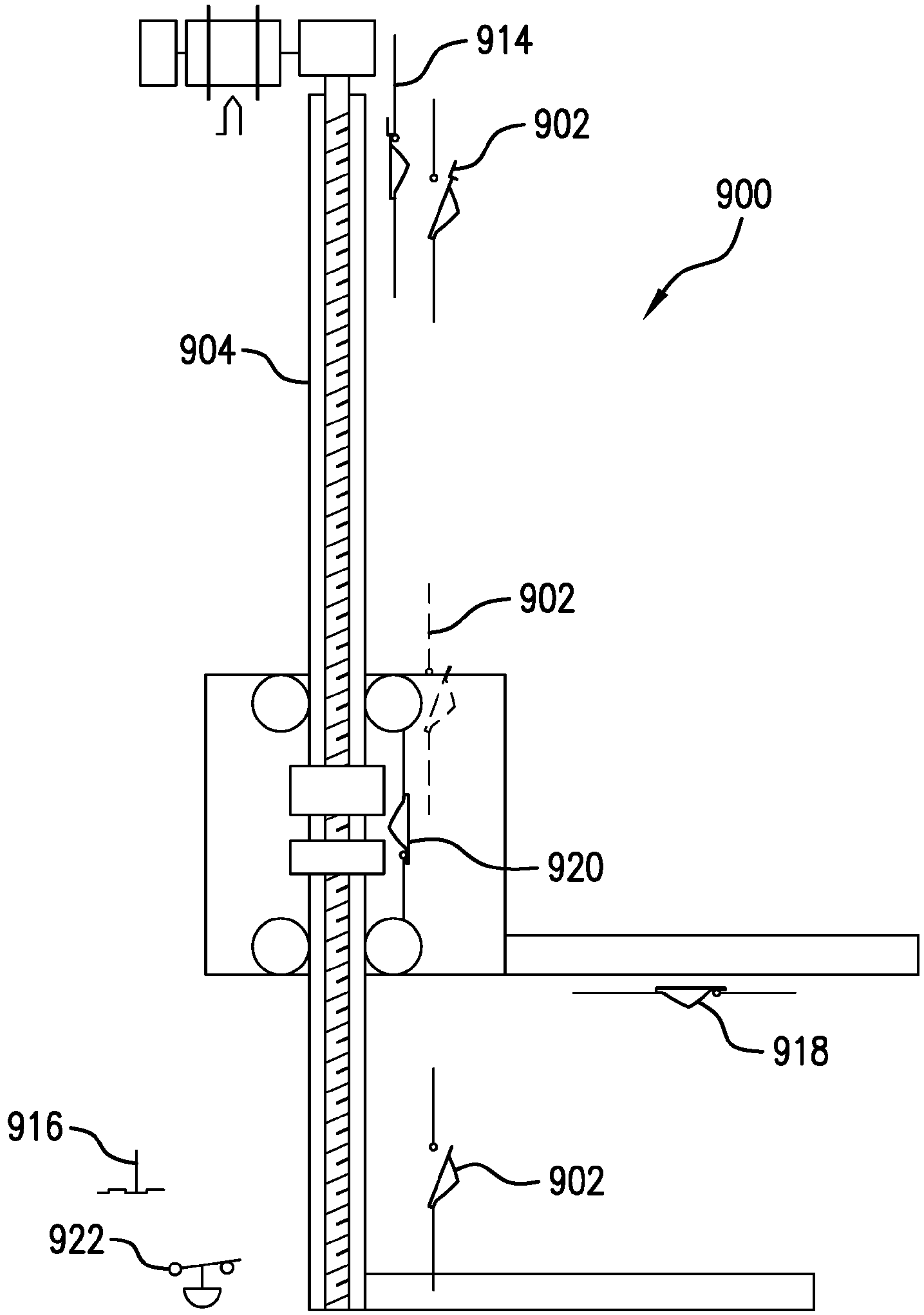
FIG. 9 shows an example control for a vertical platform lift that may be used to implement example features described herein.

In some examples, a VPL 900 may include a drive system and multiple status and platform position switches located on the frame of the VPL 900 as shown in FIG. 9. The VPL 900 may have a landing limit switch 902 on the tower frame 904 for each landing. Each landing limit switch may indicate to the control system 112 the presence of the platform 106 at a landing. For an example VPL 900 with three landings, the tower frame 904 may have three landing limit switches 902 that each may indicate to the control system 112 when they are triggered by the presence of the platform 106.

In some examples, when the cab controller 426 or the landing controller 802, 804, 818 provides a signal to the control system indicating that the platform 106 should be raised, the platform 106 may be moved upwards until it triggers an upper most landing limit switch 902. Likewise, the control system 112 may move the platform 106 to the lowest landing by lower the platform 106 until it triggers a lower most landing limit switch 902. The control system 112 may move the platform 106 to the middle landing by looking for a stored bit or flag to determine the current location of the platform 106 relative to the middle landing. The control software 112 may move the platform 106 up or down based on the platform's location relative to the middle landing and stop the platform 106 when the platform 106 triggers the middle landing limit switch 902. The control system 112 may set an error condition if the control system 112 determines that the platform 106 has not left a landing within two seconds of receiving a signal from cab controller 426 or the landing controller 802, 804, 818, based on the signal provided by the upper, lower, or middle landing limit switches 902.

The VPL 900 may be equipped with a float switch 922 connected to the control system 112. A float switch 922 may be used to sense for a threshold height of water. A float switch 922 may be located at the base of the frame 904. If the control system 112 senses, using the float switch 922, that a flooding event has impacted the VPL 900, it may set a fault condition. The fault condition may be shown using the indicator system. The control system 112 may, based on the fault condition, reduce the functionality of the lift. Following a triggering of the float switch 922, the control system 112 may prevent a user from lowering the platform 106. In some examples, the control the platform 106 may only be allowed to be raised in response to the float switch 922 being triggered to move a user away from flood waters. In some examples, the control system 112 may be adjustable to allow a 3-stop VPL 900 to move down to the middle landing if the water has only impacted the float switch 922 at the lower landing.

The control system 112 may place a delay on the float switch 922 to require that the switch be active for a certain time period to indicate that a flood event has occurred. This time delay may prevent false positives during non-flood events. Because a flood event may cause damage to various components of the drive assembly such as, for example, bearings, the control system 112 may keep count of the number of times the float switch 922 has been triggered by storing a flood cycle counter. The control system 112 may also store a time stamp corresponding with each triggering of the float switch 922. When the float switch counter is equal or greater to 1, the control system 112 may limit the trips taken by the VPL 900. The control system 112 may limit the VPL 900 to 25 round trips, or may place a time limit on how long the VPL may be operational, e.g., 1 week. In some examples, following 25 round trips or 1 week time period, the VPL 900 may stop working until maintenance is performed. The flood cycle counter in memory may be reset when maintenance is performed.

A final limit switch 914 may be placed above the top landing limit switch 902. The final limit may be the highest point the platform 106 can reach and prevent the platform 106 from exceeding the design height limits of the VPL 900. The final limit switch 914 may add a level of redundancy by activating in the event a landing limit switch 902 fails. A low limit switch or pit switch 916 may similarly be used for the lower limit of the VPL platform 106. Or alternatively, a safety pan switch 918 may be used.

A pit switch 916 may be used, by the control system 112, to immobilize the platform 106. Immobilization may be desired while performing maintenance underneath the platform 106. This area may be a confined space. The pit switch 916 may also prevent a door of the platform 106 from locking while engaged.

The drive assembly may be monitored to provide additional drive assembly data and potentially prevent unsafe conditions. The drive assembly may comprise a lead screw such as, for example, an on an acme drive screw. In some examples, the lead screw may have a drive nut to provide linear movement as the drive screw rotates. A second safety nut may be provided under the first safety nut to prevent the platform 106 from falling due to drive nut failure. A gap may be formed between the first and second safety nuts, such as, for example, 0.25-0.5 inches. The safety nut switch 920 may monitor the gap and may activate if the gap narrows or disappears. This signal from the safety nut switch 920 may indicate an issue with the drive assembly that may lead to safety concerns. Upon triggering the safety nut switch 920, the control system 112 may set a fault condition, may prevent the drive assembly from operating, and/or may trigger an alarm.

Landing lock solenoids may be used to lock access to the platform 106 by locking or releasing a VPL door on the platform 106 or at each landing. The landing lock solenoid at each landing may be energized to permit accessing the platform 106 when the platform 106 is at a landing. The landing lock solenoids may be locked when the platform 106 is not at that landing. If the pit switch is activated, the bottom lock solenoid should engage to unlock the bottom landing door to prevent someone from becoming trapped under the platform 106.

VPL doors or gates may include a power door opener. The control system 112 may open the platform door using the power door opener when the platform 106 reaches the landing. The control system 112 may use the power door opener to open a door when the platform 106 is stationary at that landing and the call/send button is pressed at the landing or the cab controller button is pressed for that landing. The power door opener may be locked by the control system 112 if a landing is reached and a landing button on the cab controller continues to be pressed. This may prevent the power door opener from engaging as the platform 106 passes a middle landing.

In some examples, the VPL 100, 900 may be powered using a battery system which may be charged using AC power. The motor may be powered through AC power and a control system 112 may be configured to switch to the battery system as a backup during a power outage.

The battery backup system may have an inverter, and maybe controlled by the control system 112. The control system control circuitry 402 may receive as inputs, the presence of AC power and if motor power is available. The control system control circuitry 402 may have, as an output to the battery backup system, a signal to change the drive assembly power from AC power to the inverter output from the battery. A signal to indicate the inverter to turn on may also be sent from the control system 112. The control system 112 may also have a charge enable output that signals a relay to disconnect the battery charger from the batteries.

Batteries for the VPL 100, 900 may degrade over time. The control system 112 may monitor the health of the batteries. The control system 112 may, for example, periodically disconnect the battery charger from the batteries to measure the battery health. The control system 112 may also measure the battery health during a power outage when the VPL 100, 900 is being powered by the batteries. By monitoring the battery health, the control system 112 may ensure that the remaining battery capacity meets a desired threshold sufficient to provide a minimum number of trips (e.g., 5 trips from the bottom landing to the top landing). The maximum capacity for a VPL battery may exceed the capacity required for the desired minimum number of trips to account for the decrease in battery health over time. The control system 112 may, based on the battery capacity, set a fault condition and indicate that the batteries may need replacing.

While powered by the battery backup system, the indicator system may show that the VPL 100, 900 is operating on battery power. When the battery backup system reaches a low battery state, e.g., 40% of total capacity and enough remaining capacity to complete one trip up and one trip down, the platform travel may continue to be allowed in both directions. The control system 112 may save, in memory, the time the battery falls below the low battery threshold. The saved time stamp of the low battery state may be used to calculate the time remaining on battery power before depletion of the batteries. When the battery backup system reaches a very low battery state, e.g., 25% of capacity, the VPL 100, 900 may restrict movement of the platform 106 from moving up. The VPL may be limited to, for example, one trip from the top landing to the bottom landing. In some examples, the control system 112 may turn off the inverter when the battery voltages drops below a certain threshold, e.g., 20.5V. The control system 112 may also save to memory the time the battery falls below the very low battery threshold, enabling the control system 112 to calculate the time remaining on battery power before depletion of the batteries. When AC mains power is restored, the control system 112 may wait to use the AC mains until a time delay, e.g., 2 minutes. The battery backup may have a multi-stage battery charger. The battery charge may monitor the open-circuit battery voltage as an indication of battery health.

The control system 112 may switch the VPL 100, 900 to a low power state to conserve energy when the VPL 100, 900 is not in use. The control system 112, while in the low power state, may turn off the indicator system and/or other components to reduce drain on the batteries. For example, the control system 112 may turn off all LEDs while the VPL 100, 900 is not in use. The low power state may allow the VPL 100, 900 to maintain battery life as long as possible. The low power state may extend the amount of time the VPL 100, 900 is able to provide the minimum desired number of trips during a power outage (e.g., 5 trips from the bottom landing to the top landing). The control system 112 may continue to monitor any VPL sensors, and may exit the low power state upon sending a change in any of the sensors. In some examples, sensors that may cause the control system 112 to exit the low power state may include button presses on a landing controller or cab controller, activating a key switch on a landing controller or cab controller, or opening or closing a gate or door to the platform 106.

It will be understood by those skilled in the art that the disclosure is not limited to the examples provided above and in the accompanying drawings. Modifications may be made by those skilled in the art, particularly in light of the foregoing teachings. Each of the features of the examples may be utilized alone or in combination or sub-combination with elements of the other examples and/or with other elements. For example, any of the above described methods or parts thereof may be combined with the other methods or parts thereof described above. The steps shown in the figures may be performed in other than the recited order, and one or more steps shown may be optional. It will also be appreciated and understood that modifications may be made without departing from the true spirit and scope of the present disclosure.

What is claimed is:

1. A platform lift apparatus comprising:
- a tower;
- a lift mechanism engaged with the tower;
- a platform attached to the lift mechanism;
- one or more sidewalls attached to, and configured to contain, the platform;
- a drive assembly engaged with the lift mechanism and configured to move the lift mechanism along the tower;
- a control system configured to communicate with the drive assembly the control system comprising:
  - a cab controller comprising one or more user inputs;
  - a landing controller comprising one or more user inputs;

control circuitry;

one or more connection ports connected to the control circuitry;

one or more load sensors, associated with the platform and configured to sense weight of the platform;

a first indicator system;

a second indicator system;

one or more processors; and memory storing instructions that, when executed by the one or more processors, cause the platform lift apparatus to:

receive, from a first sensor located on the platform lift apparatus, sensor data;

compare the received sensor data to a threshold;

determine, based on a type of the sensor data and based on the received sensor data satisfying the threshold, a fault condition;

determine, based on the fault condition and based on the received sensor data, an operating mode for the platform lift apparatus; and control, based on the operating mode, the platform lift apparatus;

wherein the first indicator system is configured to indicate the fault condition;

wherein the second indicator system is configured to indicate the fault condition;

wherein the second indicator system is viewable from the platform; and wherein the second indicator system comprises one or more LEDs configured to indicate the fault condition.

2. The platform lift apparatus of claim 1, wherein the instructions, when executed by the one or more processors, further causes the platform lift apparatus to determine, based on a comparison of the sensor data and the threshold and based on the data type, a qualitative probability and a qualitative severity.

3. The platform lift apparatus of claim 1, wherein the first sensor is a temperature sensor and the threshold corresponds to a threshold temperature.

4. The platform lift apparatus of claim 1, wherein the first sensor is a current sensor and the threshold corresponds to a threshold current.

5. The platform lift apparatus of claim 1, wherein the instructions, when executed by the one or more processors, cause the apparatus to receive, from a second sensor located on the platform lift apparatus, second sensor data, and wherein the fault condition is further determined based on the second data type and a comparison of the second sensor data to a second threshold.

6. The platform lift apparatus of claim 5, wherein the second sensor is a landing limit switch and the threshold corresponds to a platform present at the landing limit switch.

7. The platform lift apparatus of claim 1, wherein the instructions, when executed by the one or more processors, cause the apparatus to:

send the fault condition to a remote computing device, wherein the remote computing device is at a location different from the platform lift apparatus.

8. A method comprising:

providing a lift assembly comprising:

a tower;

a lift mechanism engaged with the tower;

a platform attached to the lift mechanism;

one or more sidewalls attached to, and configured to contain, the platform;

a drive assembly engaged with the lift mechanism and configured to move the lift mechanism along the tower;

a control system configured to communicate with the drive assembly, the control system comprising:

a cab controller comprising one or more user inputs;

a landing controller comprising one or more user inputs;

control circuitry;

one or more connection ports connected to the control circuitry:

one or more load sensors, associated with the platform and configured to sense weight of the platform:

a first indicator system; and a second indicator system;

receiving, by the control system of the lift assembly and from a first sensor located on the lift assembly, sensor data;

determining an operating mode for the lift assembly, wherein the operating mode is determined by the sensor data and a threshold; and controlling, based on the operating mode, the lift assembly wherein the first indicator system is configured to indicate a fault condition;

wherein the second indicator system is configured to indicate the fault condition; and wherein the second indicator system is viewable from the platform; and wherein the second indicator system comprises one or more LEDs configured to indicate the fault condition.

9. The method of claim 8, further comprising determining, based on a type of the sensor data and based on the received sensor data satisfying the threshold, a fault condition, and wherein the determining an operating mode is further determined based on the fault condition.

10. The method of claim 9, further comprising sending the fault condition to a remote computing device, wherein the remote computing device is at a location different from the lift assembly.

11. The method of claim 8, wherein the first sensor is a button and the threshold corresponds to an activation of the button.

12. The method of claim 8, wherein the first sensor is a temperature sensor and the threshold corresponds to a threshold temperature.

13. The method of claim 8, further comprising receiving, by the control system and from a second sensor located on the lift assembly, second sensor data, wherein determining the operating mode further is further determined based on the second data second sensor data.

14. The method of claim 13, wherein the second sensor is a landing limit switch and the threshold corresponds to a platform present at the landing limit switch.

15. A system comprising:

a vertical platform lift located at a premises;

a tower;

a lift mechanism engaged with the tower;

a platform attached to the lift mechanism;

one or more sidewalls attached to, and configured to contain the platform;

a drive assembly engaged with the lift mechanism and configured to move the lift mechanism along the tower;

a control system configured to communicate with the drive assembly, the control system comprising:

a cab controller comprising one or more user inputs;

a landing controller comprising one or more user inputs;

control circuitry;

one or more connection ports connected to the control circuitry;

one or more load sensors, associated with the platform and configured to sense weight of the platform;

a first indicator system;

a second indicator system;

one or more processors; and memory storing instructions that, when executed by the one or more processors, cause the control system to:

receive, from a first sensor located on the vertical platform lift, sensor data;

compare the received sensor data to a threshold;

determine, based on a type of the sensor data and based on the received sensor data satisfying the threshold, a fault condition determine, based on the fault condition, an operating mode for the vertical platform lift;

control, based on the operating mode, the vertical platform lift; and send the fault condition to a remote computing device;

wherein the first indicator system is configured to indicate the fault condition;

wherein the second indicator system is configured to indicate the fault condition; and wherein the second indicator system is viewable from the platform; and wherein the second indicator system comprises one or more LEDs configured to indicate the fault condition.

16. The system of claim 15, wherein the first sensor is a temperature sensor and the threshold corresponds to a threshold temperature.

17. The system of claim 15, wherein the first sensor is a current sensor and the threshold corresponds to a threshold current.

18. The system of claim 15, wherein the instructions, when executed by the one or more processors, cause the vertical platform lift to receive, by the control system and from a second sensor located on the vertical platform lift, second sensor data, and wherein the fault condition is further determined based on the second data type and a comparison of the second sensor data to a second threshold.

19. The system of claim 18, wherein the second sensor is a landing limit switch and the second threshold corresponds to a platform present at the landing limit switch.

* * * * *